(No Model.)

E. K. COAS.
SINGLE PLY SPIRAL TUBING.

No. 409,171. Patented Aug. 20, 1889.

WITNESSES
Samuel E. Thomas
L. A. Doelty

INVENTOR
Edward K. Coas
By Wells W. Leggett & Co
Attorneys

United States Patent Office.

EDWARD K. COAS, OF PROVIDENCE, RHODE ISLAND, ASSIGNOR TO THE DETROIT SPIRAL TUBE COMPANY, OF DETROIT, MICHIGAN.

SINGLE-PLY SPIRAL TUBING.

SPECIFICATION forming part of Letters Patent No. 409,171, dated August 20, 1889.

Application filed January 14, 1889. Serial No. 296,340. (No model.)

*To all whom it may concern:*

Be it known that I, EDWARD K. COAS, a citizen of the United States, residing at Providence, county of Providence, State of Rhode Island, have invented a certain new and useful Improvement in Single-Ply Spiral Tubing; and I declare the following to be a full, clear, and exact description of the invention, such as will enable others skilled in the art to which it pertains to make and use the same, reference being had to the accompanying drawings, which form a part of this specification.

Figure 1:
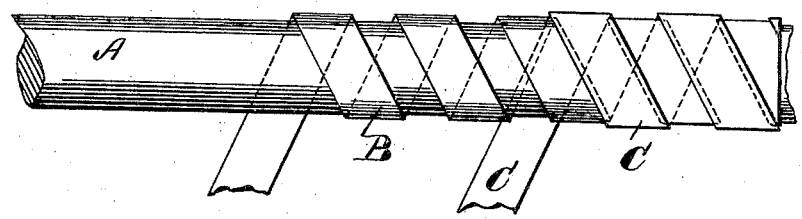
Figure 2:
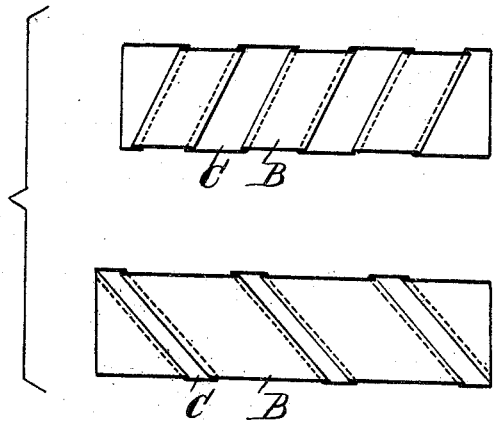

In the drawings, Figure 1 represents a mandrel with a section of my pipe wound upon it. Fig. 2 represents a cross-section of the said pipe and the cross-section of a variation.

It is the purpose of my invention to produce a cheap strong pipe of one-ply thickness, as will be hereinafter explained.

In carrying out my invention, A represents a mandrel of suitable size corresponding with the desired diameter of the pipe. Upon this mandrel I wind a ribbon of metal in such manner that each successive convolution upon the mandrel shall lie at a distance from the preceding convolution something less than the breadth of the strip.

B represents the said strip.

C is another similar strip of metal wound so as to cover the space on the mandrel which was left between the convolutions of the strip B. The strip C is thus caused to lap over the strip B at both edges of the latter, and as the said strip is wound it is in any convenient way soldered to the strip B, so as to make therewith a tight joint. These strips may be wound by any suitable machinery in any convenient way; so, also, the soldering may be accomplished by any convenient means, and any kind of solder, hard or soft, may be employed. I prefer, however, that the strips of metal shall be wound through a tank of molten solder, thereby accomplishing the union of the two strips, and that the second strip be applied to the first with sufficient tension to cause it to lie flat and snug upon the first strip.

Where steel or iron is employed, the strips are preferably tinned, in order that the solder may form a more perfect union therewith at the joint. Where brass, copper, or other similar metal is employed, the strip may or may not be first tinned; so, also, the pipe may or may not after completion be subsequently treated by tinning or galvanizing or by the application of any suitable coating for preserving it against oxidation or the action of acids or other foreign matters.

The lap at the junction of the two strips may be more or less dependent upon the required strength of the joint, and should the pipe be subsequently galvanized or tinned the solder employed should be of an alloy having a higher melting-point than the bath. A pipe of this character is exceedingly strong and is very light. It is well adapted for all purposes where a cheap, light, and strong pipe is required. One of said strips may, if desired, be broader than the other. These pipes are distinguished by the broad spaces between the edges of the convolutions from those pipes which have formed the subject-matter of other previous Letters Patent of mine, in which the strips were wound so that the successive convolutions might come together edge to edge. In this present pipe the soldered faces are narrow, so as to make the pipe essentially a one-ply pipe.

What I claim is—

1. A metallic pipe formed by winding a ribbon of metal upon a mandrel, with a space between its successive convolutions, and a second strip wound over said space and lapping at both edges over the edges of the first strip and soldered thereto along the meeting faces, substantially as described.

2. A metallic pipe formed by winding a tinned strip of iron or steel upon a mandrel, with a wide space between its successive convolutions, then winding thereon through a solder-bath another tinned strip of iron or steel over said space and lapping onto the metal on both sides thereof, said two strips being thus soldered together along their meeting faces, substantially as described.

In testimony whereof I sign this specification in the presence of two witnesses.

EDWARD K. COAS.

Witnesses:
FREDERIC S. ANDREWS,
WM. L. HAINES.